US012646270B2

(12) United States Patent
Da Veiga et al.

(10) Patent No.: US 12,646,270 B2
(45) Date of Patent: Jun. 2, 2026

(54) PORTAL VIEW FOR CONTENT ITEMS

(71) Applicant: APPLE INC., Cupertino, CA (US)

(72) Inventors: Alexandre Da Veiga, San Francisco, CA (US); Timothy T. Chong, Sunnyvale, CA (US); Timothy R. Pease, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 18/609,826

(22) Filed: Mar. 19, 2024

(65) Prior Publication Data

US 2024/0257478 A1      Aug. 1, 2024

Related U.S. Application Data

(63) Continuation of application No. PCT/US2022/044059, filed on Sep. 20, 2022.
(Continued)

(51) Int. Cl.
*G06T 19/00*      (2011.01)
*G06T 13/20*      (2011.01)
(Continued)

(52) U.S. Cl.
CPC ............ *G06T 19/006* (2013.01); *G06T 13/20* (2013.01); *G06T 19/20* (2013.01); *G06V 10/245* (2022.01);
(Continued)

(58) Field of Classification Search
None
See application file for complete search history.

(56) References Cited

U.S. PATENT DOCUMENTS 6,285,370 B1      9/2001  McDowall
10,304,247 B2 *   5/2019  King ...................... G06F 3/011
(Continued)

FOREIGN PATENT DOCUMENTS

EP         3798801 A1      3/2021
JP      2016062486 A      4/2016
(Continued)

OTHER PUBLICATIONS

European Patent Office (ISA/EP), International Search Report and Written Opinion of the International Searching Authority, International Application No. PCT/US2022/044059, 13 pages, Mar. 19, 2024.
(Continued)

*Primary Examiner* — Martin Mushambo
(74) *Attorney, Agent, or Firm* — Thompson Hine LLP

(57) ABSTRACT
Various implementations disclosed herein include devices, systems, and methods that provide an XR environment that depicts an environment with a viewing portal for viewing an added content item that is positioned behind the viewing portal. Some implementations determine a first position for a viewing portal within a 3D coordinate system corresponding to an environment, determine a second position for a content item within the 3D coordinate system, where the second position is opposite a front surface of the viewing portal, and determine a viewpoint of an electronic device within the 3D coordinate system. In some implementations, a portion of the content item visible through the viewing portal from the viewpoint is identified, where the portion is identified based on the first position, the second position, and the viewpoint. Then, a view of the identified portion of the content item is provided in the environment.

25 Claims, 12 Drawing Sheets determine a first position for a viewing portal within a 3D coordinate system corresponding to an environment — 710 determine a second position for a content item within the 3D coordinate system, the second position opposite a front surface of the viewing portal — 720 generate a surface object, where the surface object is textured with an image corresponding to the content item, and where the surface object is positioned at the second position — 730 determine a viewpoint of the electronic device within the 3D coordinate system — 740 identify a portion of the surface object visible through the viewing portal from the viewpoint, where the portion is identified based on the first position, the second position, and the viewpoint — 750 provide a view of the identified portion of the surface object in the physical environment — 760

Related U.S. Application Data

(60) Provisional application No. 63/247,922, filed on Sep. 24, 2021.

(51) Int. Cl.
| | |
|---|---|
| *G06T 19/20* | (2011.01) |
| *G06V 10/24* | (2022.01) |
| *G06V 10/25* | (2022.01) |

(52) U.S. Cl.
CPC ...... *G06V 10/25* (2022.01); *G06T 2219/2004* (2013.01); *G06T 2219/2016* (2013.01)

(56) References Cited

U.S. PATENT DOCUMENTS

| | | | | |
|---|---|---|---|---|
| 10,372,289 B2 * | 8/2019 | Rao | ........................ | G06F 3/0484 |
| 2002/0176636 A1 * | 11/2002 | Shefi | ........................ | G06T 15/20 |
| | | | | 382/285 |
| 2014/0002491 A1 | 1/2014 | Lamb | | |
| 2016/0086306 A1 * | 3/2016 | Nishimaki | .......... | G02B 27/017 |
| | | | | 345/620 |
| 2016/0163063 A1 * | 6/2016 | Ashman | ................ | G06T 19/006 |
| | | | | 345/633 |
| 2017/0256096 A1 * | 9/2017 | Faaborg | ................ | G06T 19/003 |
| 2018/0004391 A1 | 1/2018 | Rao | | |
| 2018/0122042 A1 * | 5/2018 | Kim | ..................... | H04N 5/2628 |
| 2019/0199993 A1 * | 6/2019 | Babu J D | ............... | G06T 15/08 |
| 2020/0380769 A1 * | 12/2020 | Liu | ........................ | G06V 40/20 |
| 2023/0186569 A1 * | 6/2023 | Willkie | ..................... | G06T 7/12 |
| | | | | 345/633 |

FOREIGN PATENT DOCUMENTS

| | | |
|---|---|---|
| JP | 2021517309 A | 7/2021 |
| WO | 2016089655 A1 | 6/2016 |
| WO | 2017100017 A1 | 6/2017 |

OTHER PUBLICATIONS

Korean Intellectual Property Office, Notice to File a Response issued in counterpart Korean Patent Application No. 10-2024-7009453 dated Jul. 21, 2025 with English translation (15 pages).
Japanese Patent Office, Notification of Ground(s) for Rejection issued in counterpart Japanese Patent Application No. 2024-518372 dated Feb. 20, 2025 with English translation (12 pages).
Ministry of Intellectual Property Korea, Notice of Allowance issued in Korean Patent Application No. 10-2024-7009453 dated Apr. 13, 2026 with English translation (Three (3) pages).

* cited by examiner

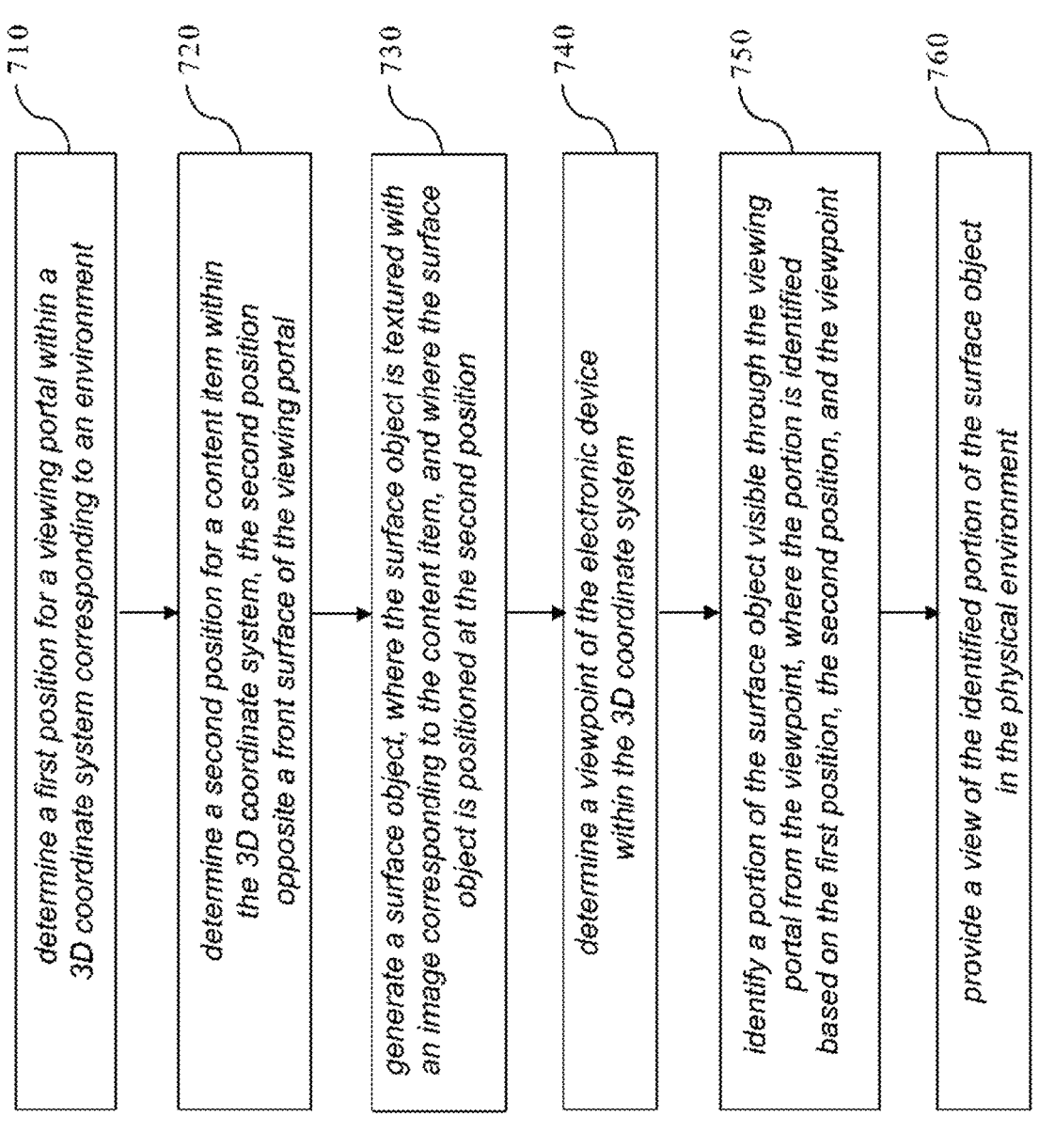

710 determine a first position for a viewing portal within a 3D coordinate system corresponding to an environment 720 determine a second position for a content item within the 3D coordinate system, the second position opposite a front surface of the viewing portal 730 generate a surface object, where the surface object is textured with an image corresponding to the content item, and where the surface object is positioned at the second position 740 determine a viewpoint of the electronic device within the 3D coordinate system 750 identify a portion of the surface object visible through the viewing portal from the viewpoint, where the portion is identified based on the first position, the second position, and the viewpoint 760 provide a view of the identified portion of the surface object in the physical environment

FIGURE 7

PORTAL VIEW FOR CONTENT ITEMS

CROSS-REFERENCE TO RELATED APPLICATIONS

This patent application is a continuation of International Application No. PCT/US2022/044059 (International Publication No. WO 2023/049087) filed on Sep. 20, 2022, which claims priority of U.S. Provisional Application No. 63/247,922 filed on Sep. 24, 2021, entitled "PORTAL VIEW FOR CONTENT ITEMS," each of which is incorporated herein by this reference in its entirety.

TECHNICAL FIELD

The present disclosure generally relates to electronic devices that display virtual content and, in particular, to systems, methods, and devices that provide a view of virtual content in a physical environment.

BACKGROUND

Extended reality (XR) environments provide views that combine real and virtual content in various ways. For example, an XR environment may include a view that includes a virtual content item corresponding to a two dimensional (2D) photograph that is viewed within a real physical environment. Existing systems and techniques may not display such virtual content in ways that adequately distinguish the virtual content from the surrounding physical environment. For example, a 2D photograph may be displayed such that its edges are not easy to distinguish from surrounding physical environment or such that portions of the virtual content appear to extend through the bounds/walls of the physical environment. There exists a need for improved techniques for providing views of XR environments with virtual 2D photographs within physical environments.

SUMMARY

Various implementations disclosed herein include devices, systems, and methods that provide a view of an XR environment including a physical environment with a viewing portal for viewing an added virtual content item that is positioned at a distance behind the viewing portal. For example, a panoramic photograph may be textured onto a virtual curved surface that is a calculated distance such as 10 meters behind the viewing portal. In some implementations, placing a content item behind the viewing portal may provide a desirable appearance, for example, better distinguishing the content item from the physical environment at the edges of the viewing portal. In some implementations, multiple viewing portals of different content items may be presented concurrently and selection of one of the content items may trigger provision of an expanded viewing portal for the selected content item. Alternatively, multiple viewing portals may show the same content item, for example, to enable comparison of different imaging effects applied to the same content item.

In general, one innovative aspect of the subject matter described in this specification can be embodied in methods that include the actions of determining a first position for a viewing portal within a 3D coordinate system corresponding to an environment, and determining a second position for a content item within the 3D coordinate system, where the second position is opposite a front surface of the viewing portal. Then, a viewpoint of an electronic device is determined within the 3D coordinate system. In some implementations, a portion of the content item visible through the viewing portal from the viewpoint is identified, where the portion is identified based on the first position, the second position, and the viewpoint. Then, a view of the identified portion of the content item in the environment is provided.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart illustrating an exemplary method that provides a view of an XR environment that depicts a physical environment with a viewing portal for viewing an added content item that is positioned behind the viewing portal in accordance with some implementations.

Figure 1:
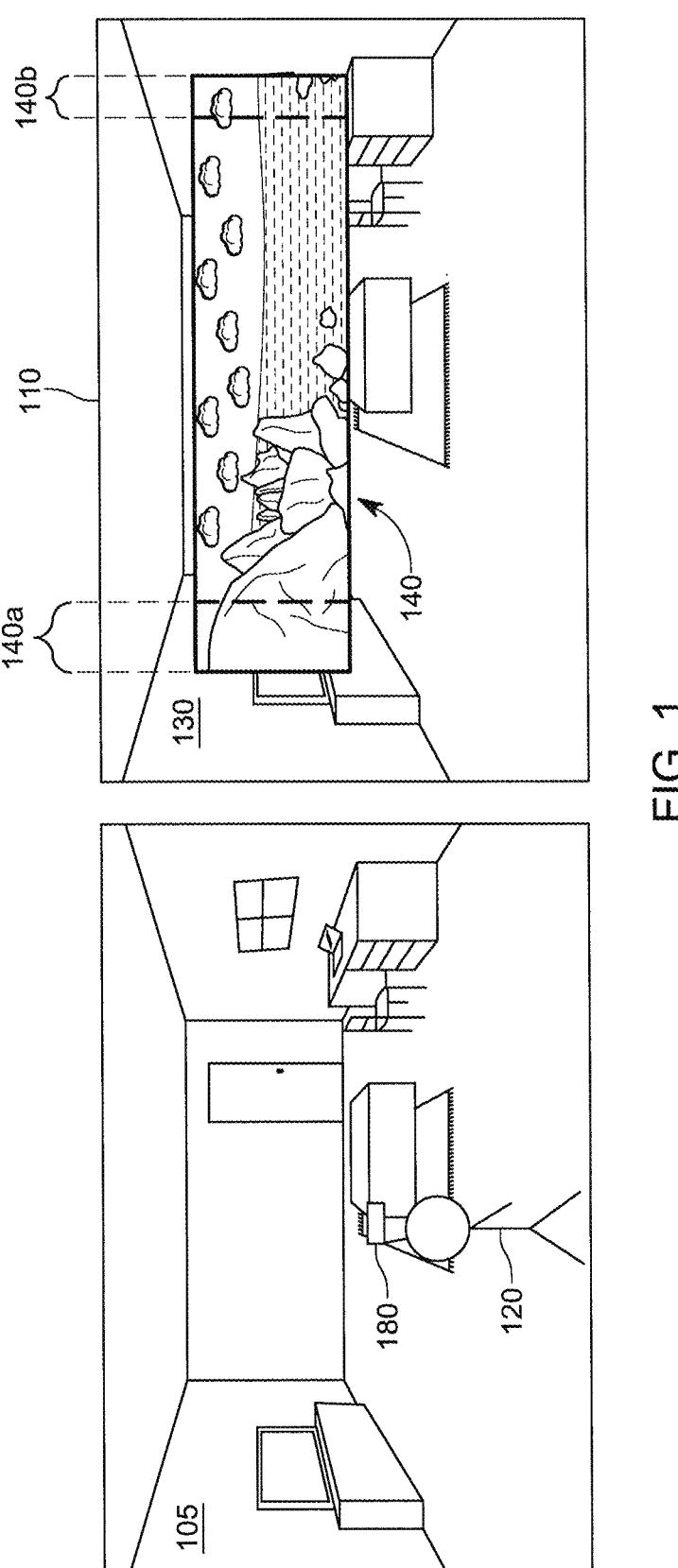
FIG. 1 illustrates an electronic device in a physical environment, where the electronic device is displaying a view of an XR environment that includes virtual content depicted within the physical environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide a view of an XR environment that includes a depiction of a physical environment with a viewing portal for viewing an added content item that is positioned behind the viewing portal (e.g., opposite a front surface of the viewing portal). In some implementations, the viewing portal is a virtual 2D planar surface (e.g., a planar region bounded by a rounded rectangle). In some implementations, the added content item is displayed using a surface placed a prescribed distance (e.g., by 10 meters or some other distance) behind the viewing portal. For example, a 2D panorama picture can be textured onto a vertically flat and horizontally curve surface 10 meters behind and centered on the viewing portal.

Placing the added content item at a distance behind the viewing portal enables the user of an electronic device to focus at a depth beyond the viewing portal window. The displacement of the content behind the portal may make the difference between the content viewed at the edges of the portal and the surrounding environment more distinct. The displacement of the content behind the portal may also provide an appearance of depth between the portal and the virtual content and/or within the 2D virtual content itself. The virtual content may include 2D pictures, 2D images, 2D panoramas, etc.

The viewing portal configuration may be determined based on the content that will be viewed through it and/or the physical environment. In some implementations, the viewing portal shape and/or size is controlled so that the viewing portal displayed in the physical environment does not intersect physical boundaries (e.g., walls, ceiling, floor) of the physical environment.

FIG. 1 illustrates a user 120 using an electronic device 180 within a physical environment 105. The physical environment 105, in this example, is a room or an office within a house. The electronic device 180 presents an XR environment.

As shown in FIG. 1, a display 110 of an electronic device 180 is presenting an XR environment that includes a 2D photograph (e.g., a panoramic photograph) as virtual content 140 within a depiction 130 of the physical environment 105. The virtual content 140 appears to be floating in the physical environment 105. However, the 2D panoramic photograph 140 displayed at the correct scale blocks an undesirably large portion of the depiction of the physical environment 105, and in this case eclipses the physical environment 105 because portions 140*a*, 140*b* of the virtual content 140 extend beyond the walls of the physical environment 105. In some cases, the virtual content 140 can cover other user interfaces or virtual content presented in the XR environment. This can occur particularly when viewing multiple large virtual content items such as the 2D panoramic photograph 140 in the physical environment 105.

Accordingly, in some implementations, the virtual content and the physical or virtual environment are separated using a viewing portal (e.g., user interface). For example, the viewing portal can be a 2D planar surface (e.g., a planar region bounded by a rounded rectangle) in the physical or virtual environment that acts as a portal into a 3D virtual environment. Contained within that virtual environment can be a surface oriented toward the viewing portal and placed at a prescribed depth behind the viewing portal (e.g., by 10 meters or some other distance) to display the virtual content with the appearance of depth in the 3D virtual environment. The distance the virtual content (e.g., 2D photograph) is placed behind the viewing portal is chosen in order to give a viewing person (e.g., eye/brain) the illusion that the scene of the photograph is true scale, or in other words, the illusion that the person is looking out a window at a real landscape or a real environment. People can judge distance (partially) by the angle of convergence of their eyes, and once the subject of the person's focus is past several meters, their brain can no longer distinguish actual depth from eye convergence (e.g., they are said to be focused on "infinity" at that point). In this case, secondary considerations (e.g., geometry, relative size, shadows, etc.) in the presentation can provide alternative hints at depth using the separated viewing portal and virtual content placement on surfaces behind the viewing portals.

In some implementations, the virtual content includes 2D photographs, 2D panoramic photographs, or 2D depth segregated photographs. The 2D depth segregated photographs may include at least one portion (e.g., a subject of the photograph) having a first depth and a second portion (e.g., background) having a second depth larger than the first depth.

Figure 2:
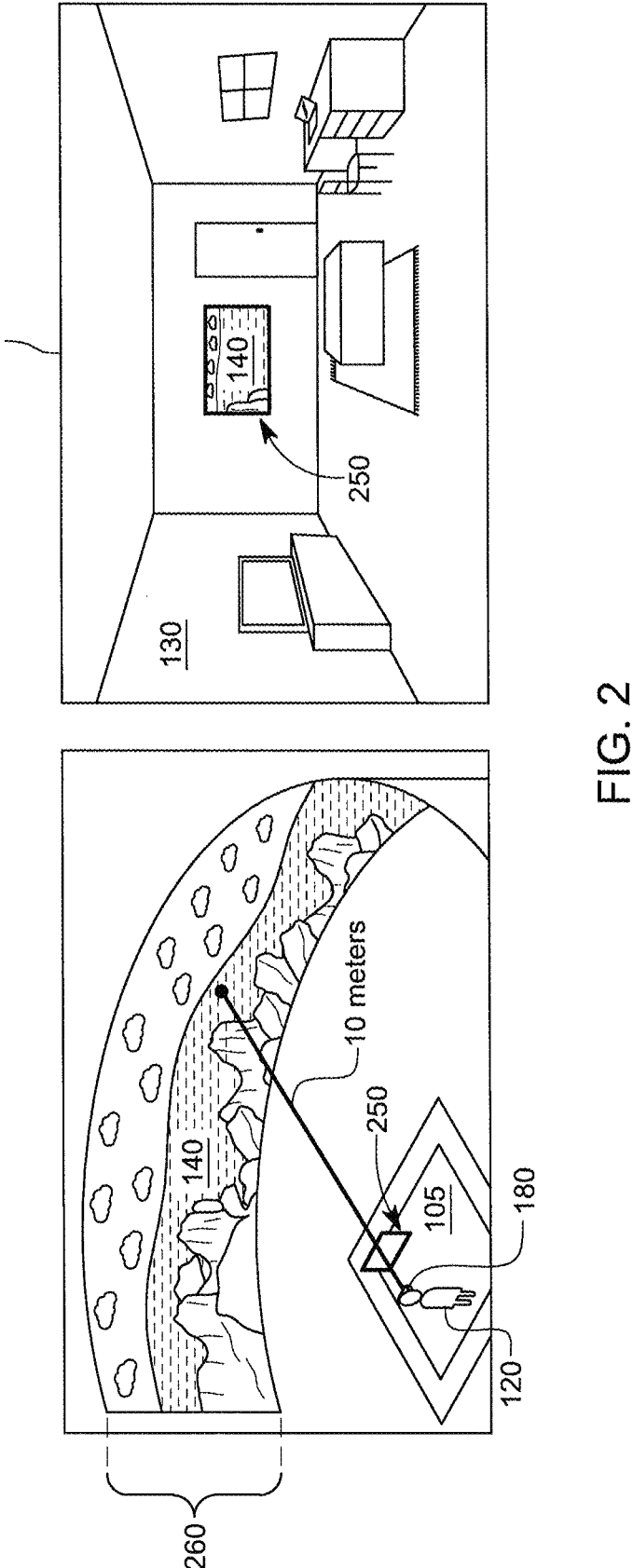
FIG. 2 illustrates virtual content displaced behind and viewed through an example viewing portal in accordance with some implementations.

FIG. 2 illustrates virtual content displaced behind and viewed through an example viewing portal. As shown in FIG. 2, the display 110 of the electronic device 180 is displaying the virtual content 140 textured onto a surface 260 that is vertically flat and horizontally curved to be 10 meters (e.g., a preset distance) behind a viewing portal 250. In some examples, the surface 260 may include a full or partial cylindrical shell centered around viewing portal 250. In FIG. 2, the virtual content 140 displayed behind the viewing portal 250 has a focal distance that is different and larger than the distance to the viewing portal 250.

In some implementations, the virtual content 140 is positioned behind the viewing portal 250 to give the appearance of depth when viewed through the viewing portal 250 in the physical environment 105. As shown in FIG. 2, as the electronic device 180 moves in the physical environment 105, the portion of the virtual content 140 visible through the viewing portal 250 changes according to the changing viewpoint of the electronic device 180. For example, when the electronic device 180 moves to the left in the physical environment 105, additional areas to the right of the virtual content 140 become visible through the stationary viewing portal 250. It should be appreciated that virtual content 140 on surface 260 may only be viewable through viewing portal 250. For example, if the user were to move to the side of or behind viewing portal 250 in depiction 130 of the physical environment 105, neither the virtual content 140 nor the surface 260 would be visible behind the viewing portal 250.

In some implementations, an initial position of the viewing portal 250 relative to the depiction 130 of the physical environment 105 in the XR environment is a default position in front of and oriented toward the electronic device 180. For example, the initial position of the viewing portal 250 can be 3 feet in front of and facing the electronic device 180 and 5 feet above the floor (e.g., a ground plane) of the physical environment 105. In some implementations, an initial size and shape of the viewing portal 250 is determined by the application that is executing and displaying the corresponding virtual content behind and visible through the viewing portal 250. In some implementations, the viewing position of the viewing portal 250 relative to the physical environment 105 is manually controlled and can be moved by a user 120 of the electronic device 180.

In some implementations, an initial position of the virtual content 140 is oriented toward (e.g., centered on) the viewing portal 250. In some implementations, a horizon or a horizon line of the surface 260 or depicted in the virtual content 140 behind the viewing portal 250 is aligned with the horizon or the horizon line of the physical environment 105 or other viewing environment. Such alignment may be achieved by tracking the position and orientation of the device 180 in the physical environment, identifying a location of the horizon line based on the orientation and position of the device 180, identifying a horizon line depicted in 2D content (e.g., based on image analysis or metadata such as capture information associated with the capture of the 2D content), and aligning the horizon lines when positioning the 2D content relative to the depiction of the physical environment. In some implementations, a ground plane of the surface 260 or depicted in the virtual content 140 behind the viewing portal 250 is aligned with a ground plane of the physical environment 105 or other viewing environment. In some implementations, the positioning and shape of the surface 260 is determined by the application that is executing and displaying the corresponding virtual content on the surface 260 to be viewed through a corresponding viewing portal. In some implementations, the physical environment 105 or other viewing environment may not include other surfaces or content.

In some implementations, virtual content is not appropriate to be positioned behind and viewed through a corresponding viewing portal based on the depth (e.g., focal distances) contained in the virtual content. For example, it may be undesirable to use panoramas that were created including subject matter close to the capturing image sensor because the stereo capture may result in a noticeable difference between a left eye capture and a right eye capture, which may result in visual discomfort when viewed through the viewing portal.

Figure 3A:
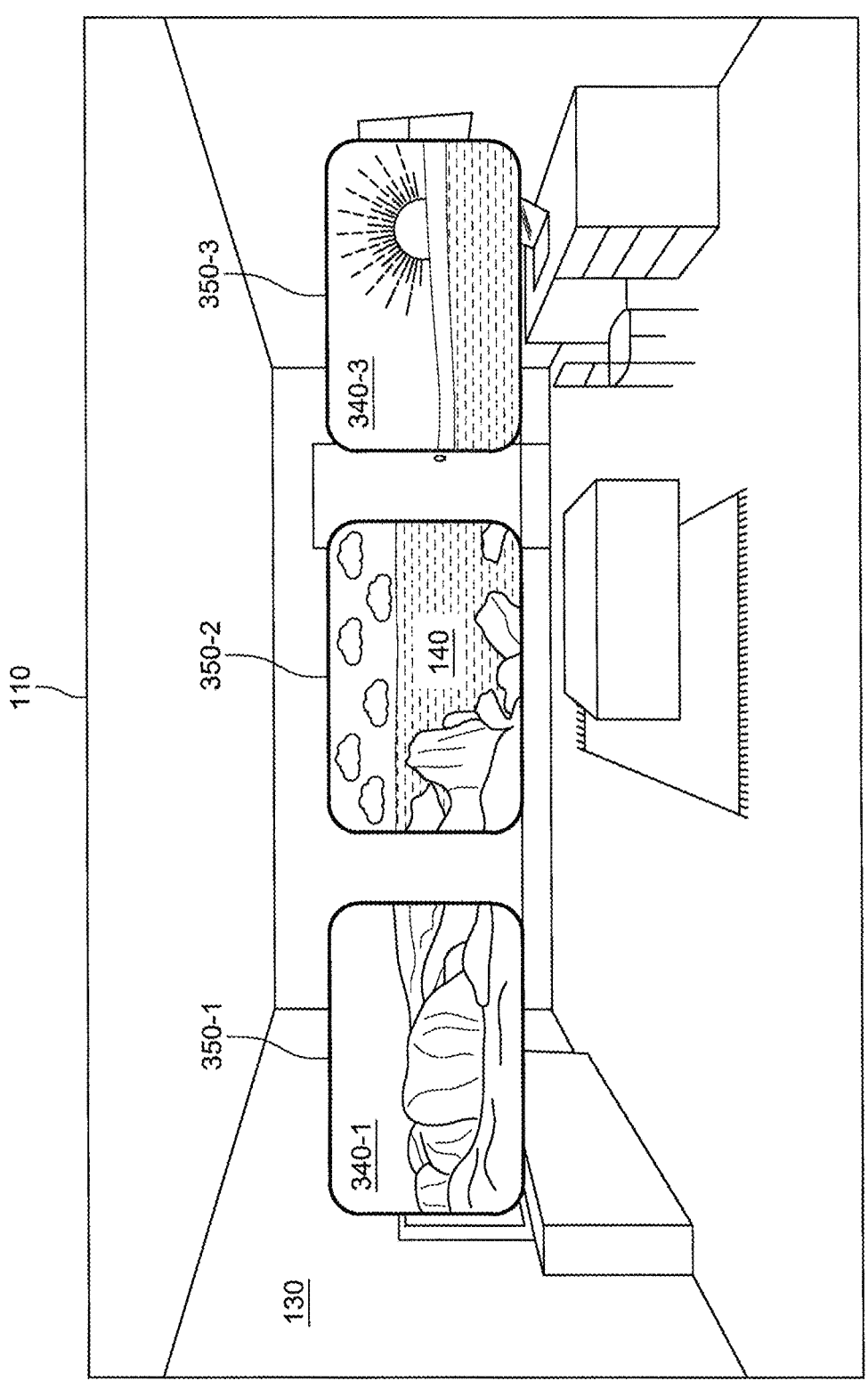
FIGS. 3A-3C illustrates a view of an XR environment that includes respective virtual content displaced behind and viewed through a plurality of example viewing portals in accordance with some implementations.

FIG. 3A illustrates respective virtual content displaced behind and viewed through a plurality of example viewing portals. As shown in FIG. 3A, the display 110 shows a panoramic 2D photograph as virtual content 340-1 visible through a viewing portal 350-1, the virtual content 140 visible through a viewing portal 350-2, and panoramic 2D photograph as the virtual content 340-3 visible through a viewing portal 350-3. The virtual content 340-1 is a rocky desert hilltop, the virtual content 140 is a rocky coast of a lake, and the virtual content 340-3 is a sunrise over water. In some implementations, portions of the virtual content 340-1, 140, 340-3 visible through the viewing portals 350-1, 350-2, 350-3 are displayed on different corresponding surfaces displaced behind each respective one of the viewing portals 350-1, 350-2, 350-3. A surface and associated virtual content may only be viewed through a respective viewing portal (e.g., virtual content 340-1 may be viewed through viewing portal 350-1, but not through viewing portals 350-2 and 350-3). In some implementations, the corresponding surfaces can be placed to have a common focal distance based on characteristics (e.g., size, capture parameters, subject size, shape, etc.) of the respective virtual content 340-1, 140, 340-3. In some implementations, the corresponding surfaces may be centered around and displaced behind each respective viewing portal. In other words, the corresponding surfaces, if placed within the same virtual environment, may be positioned at different locations, but may be partially overlapping.

Figure 3B:
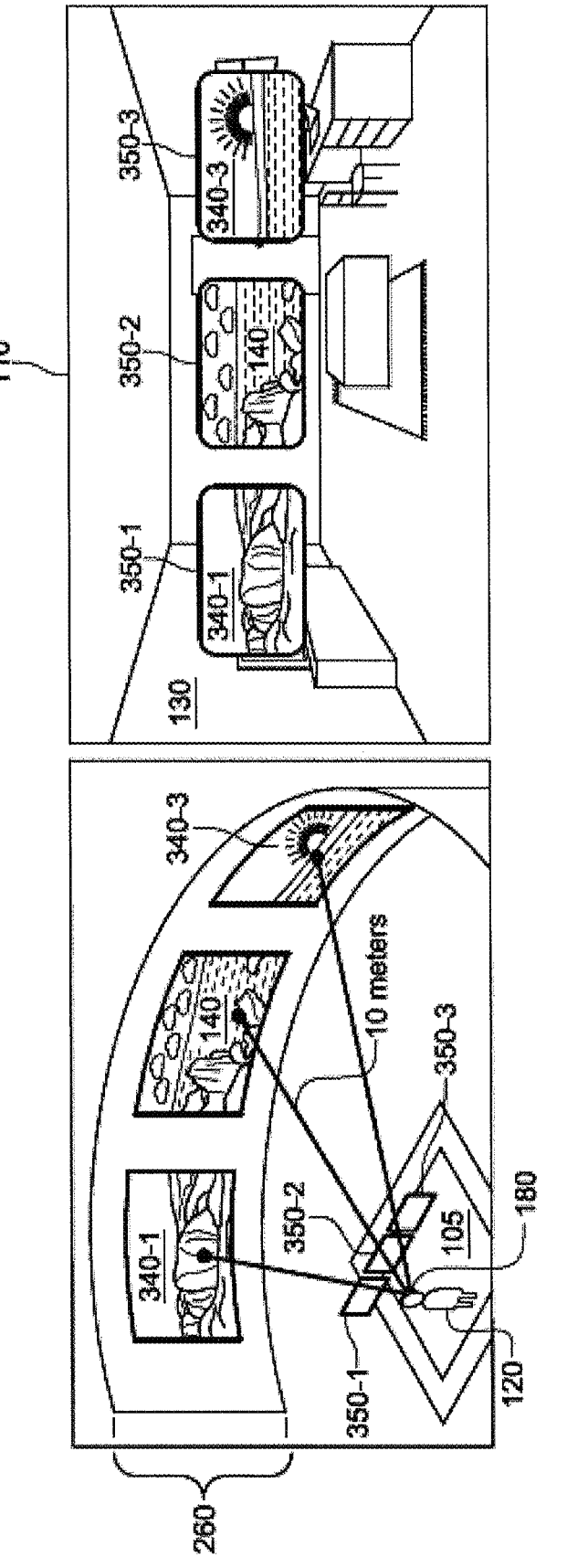

As shown in FIG. 3B, the portions of the virtual content 340-1, 140, 340-3 visible through the viewing portals 350-1, 350-2, 350-3 may be displayed on the same surface 260 or may be displayed on different surfaces positioned at the same location. Accordingly, a focal distance for the virtual content 340-1, 140, 340-3 can be the same. The focal distance of the virtual content 340-1, 140, 340-3 can be different and larger than the distance to the viewing portals 350-1, 350-2, 350-3. For example, the common focal distance allows the user 120 to easily switch their attention between the respective virtual content 340-1, 140, 340-3 in the physical environment 105. In some implementations, the viewing portals 350-1, 350-2, 350-3 have a common shape and size. In some implementations, the viewing portals 350-1, 350-2, 350-3 are different sizes but maintain a common shape, which may enable the user 120 to better recognize and distinguish the virtual content 340-1, 140, 340-3 from the physical environment 105. In some implementations, the viewing portals 350-1, 350-2, 350-3 have rounded corners, which may further enable the user 120 to distinguish the 3D virtual environments viewed through the viewing portals 350-1, 350-2, 350-3 from the physical environment 105 viewed around the viewing portals 350-1, 350-2, 350-3. The rounded corners on the viewing portals 350-1, 350-2, 350-3 may use the same radius for the curved corners. In some implementations, the viewing portals 350-1, 350-2, 350-3 have edges with perceptible depth. In some implementations, edge effects of the viewing portals 350-1, 350-2, 350-3 allow for consistent or desired lighting effects to be provided with respect to lighting effects in the virtual content and the viewing portal (e.g., light is spilling out of the viewing portal).

Figure 3C:
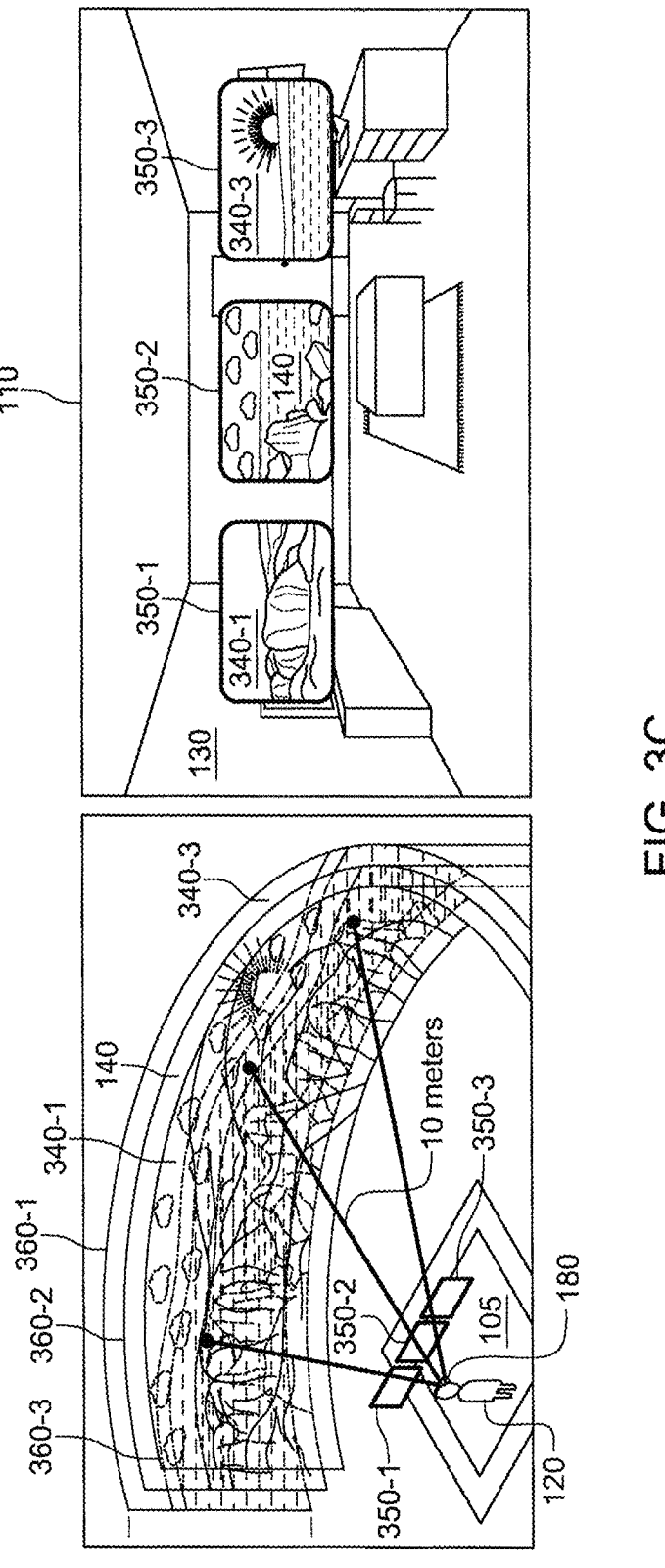

As shown in FIG. 3C, the portions of the virtual content 340-1, 140, 340-3 visible through the viewing portals 350-1, 350-2, 350-3 may be displayed on different surfaces 360-1, 360-2, 360-3 positioned at the same or different XR environments. In some implementations, positioning the different virtual content 340-1, 140, 340-3 on different respective surfaces 360-1, 360-2, 360-3 behind the corresponding viewing portals 350-1, 350-2, 350-3 that are viewed concurrently in the physical or virtual environment, the different respective surfaces 360-1, 360-2, 360-3 may be determined so that respective focal distances of viewable portions of the different virtual content 340-1, 140, 340-3 are similar to each other and all different than a distance from the user 120 to the viewing portals 350-1, 350-2, 350-3.

In some implementations, the design (e.g., size, shape, aspect ratio, depth, animation, etc.) of the viewing portal is determined by the application that is executing and/or displaying the corresponding virtual content behind and visible through the viewing portal. The separation of the viewing portal and the virtual content visible through but displayed behind a corresponding viewing portal enables the design of the corresponding viewing portal to be changed (e.g., expanded, stretched, or animated) without modifying the virtual content. In some implementations, the corresponding viewing portal always covers the edges of the virtual content visible therethrough. For example, the viewing portal can change (e.g., size, shape, etc.) based on the virtual content visible therethrough to prevent a visible gap between the corresponding viewing portal and the viewed virtual content no matter where the user 120 moves within the physical environment 105. In some implementations, the corresponding viewing portal is removed from the physical environment 105 to prevent the visible gap between the corresponding viewing portal and the viewed virtual content. In some implementations, the arrangement of the virtual content behind the viewing portal (e.g., displayed size) is based on an original size of the virtual content or depictions therein and the physical environment 105.

Figure 3D:
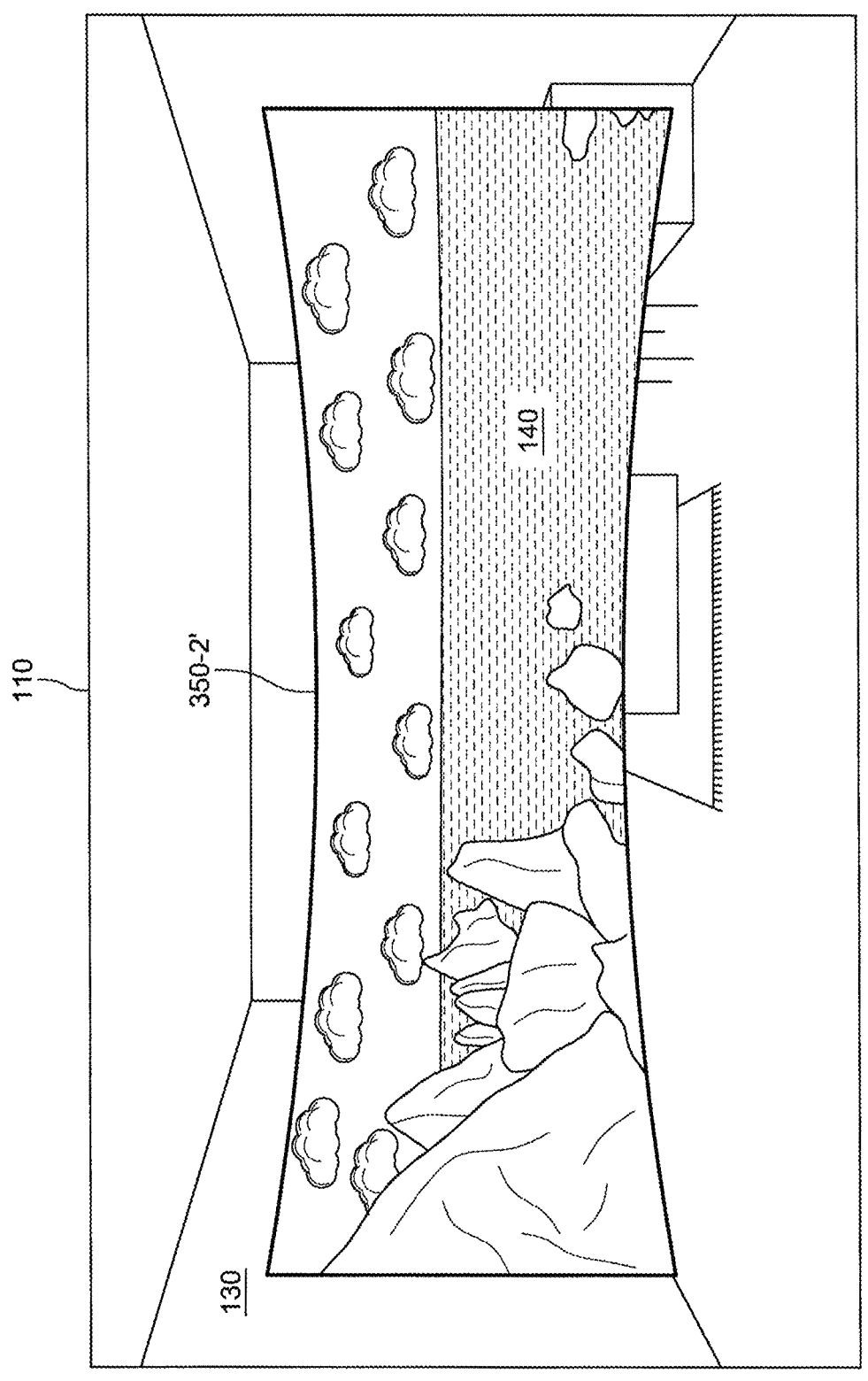
FIG. 3D illustrates a view of an XR environment that includes a selected virtual content item displaced behind and viewed through an expanded example viewing portal in accordance with some implementations.

FIG. 3D illustrates a selected virtual content item displaced behind and viewed through an expanded example viewing portal. Upon the selection of the virtual content 140 by the user 120 as shown in FIG. 3A, the viewing portal 350-2 may be expanded and stretched so that more of the 2D panoramic photograph 140 is visible to the user 120. As shown in FIG. 3D, upon the selection of the virtual content 140 by the user 120 in FIG. 3B, all 180 degrees of the 2D panoramic photograph 140 is visible on the surface 260 to the user 120 through the expanded viewing portal 350-2' in the physical environment 105. In this case, the viewing portal 350-2' can provide the visual effect of the user 120 entering the virtual environment behind the viewing portal 350-2 shown in FIGS. 3A-3C. In some implementations, there are other types of effects (e.g., audio, etc.) that can be applied based on which virtual content 340-1, 140, 340-3 is selected and where the corresponding viewing portal is positioned relative to the physical environment 105.

In some implementation, if the 2D panoramic photograph 140 included 360 degrees when created, the 360 degrees of the virtual content 140 can be viewed through the viewing portal 350-2' that can frame a surface shaped like a sphere with the top and bottom removed and displayed within the physical environment 105 as the user 120 turns 360 degrees in the physical environment 105. Further, virtual content displayed behind a corresponding viewing portal can include orientations other than horizontal. For example, panoramas can be oriented vertically, at 30- or 45-degree angles, etc.

Figure 4:
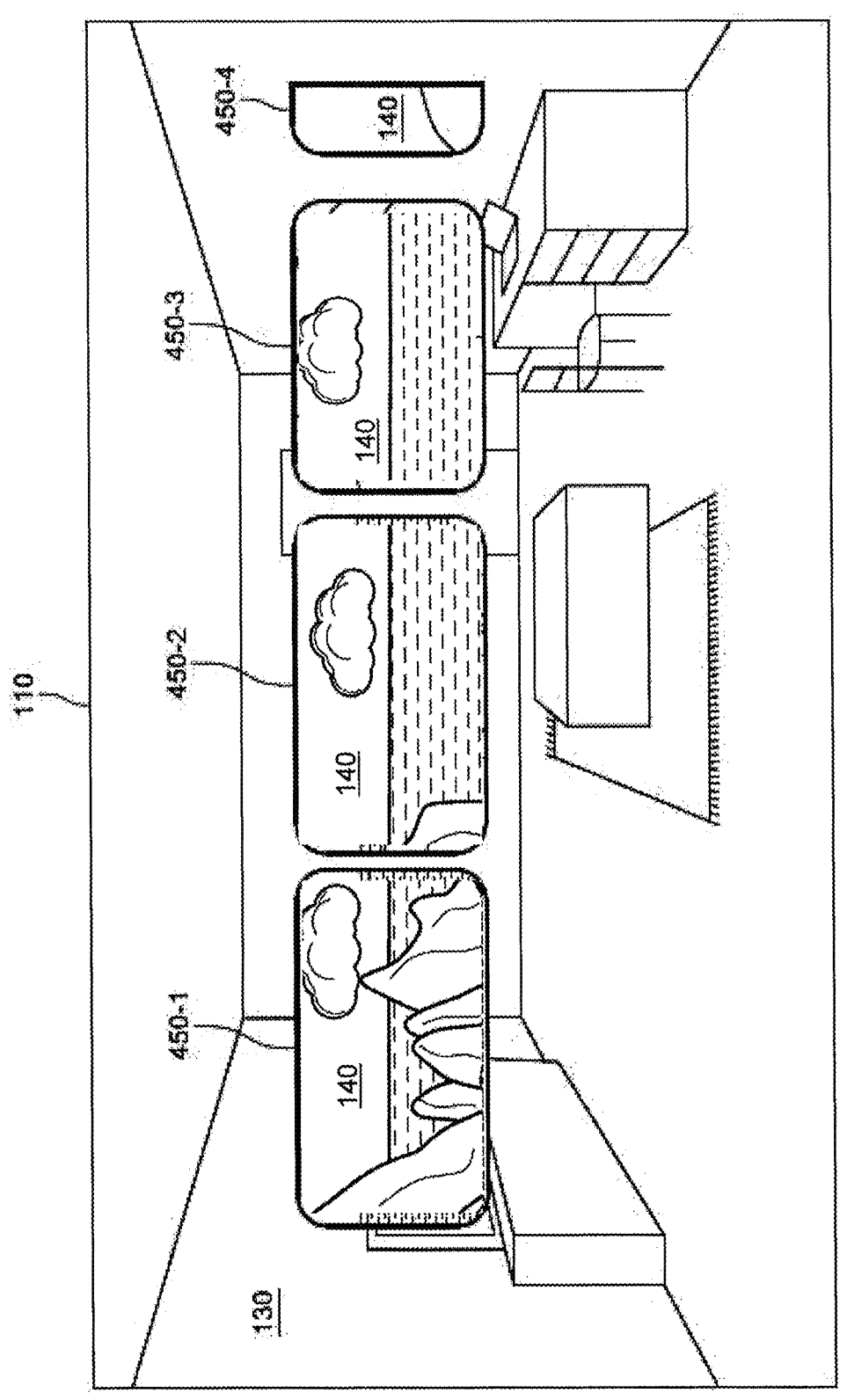
FIG. 4 illustrates a view of an XR environment that includes virtual content displaced behind and viewed through a plurality of example viewing portals in accordance with some implementations.

FIG. 4 illustrates virtual content displaced behind and viewed through a plurality of example viewing portals. As shown in FIG. 4, the display 110 shows a virtual content 140 visible to the user 120 through a plurality of viewing portals 450-1, 450-2, 450-3, 450-4. The virtual content 140 includes the rocky coast of a lake, part of the lake and clouds in the distance over the lake. In some implementations, the virtual content 140 is displayed on a single 2D surface extending behind the viewing portals 450-1, 450-2, 450-3, 450-4 and different portions of the virtual content 140 are visible through each of the viewing portals 450-1, 450-2, 450-3, 450-4 based on the viewpoint of the electronic device 180 in the physical environment 105. As shown in FIG. 4, the virtual content 140 is displayed on a flat 2D planar surface behind the viewing portals 450-1, 450-2, 450-3, and 450-4, respectively, when viewed by the user 120 in the viewing portals 450-1, 450-2, 450-3, 450-4 in the physical environment 105.

As shown in FIG. 4, each of the viewing portals 450-1, 450-2, 450-3, 450-4 is applying a different artistic effect to the same 2D panoramic image 140 visible therethrough to the user 120. For example, different visual effects can include but are not limited to effects that enhance vivid warm hues, silver tone, monotone, cool hues, natural light, and the like. The visual effects can make the virtual content appear more like a sketch or a painting, adjust sharpness, color, brightness or contrast. In this manner, the viewing portals 450-1, 450-2, 450-3, 450-4 provide a tangible way for the user 120 to concurrently see the virtual content 140 through different simulations of visual effects.

Figure 5:
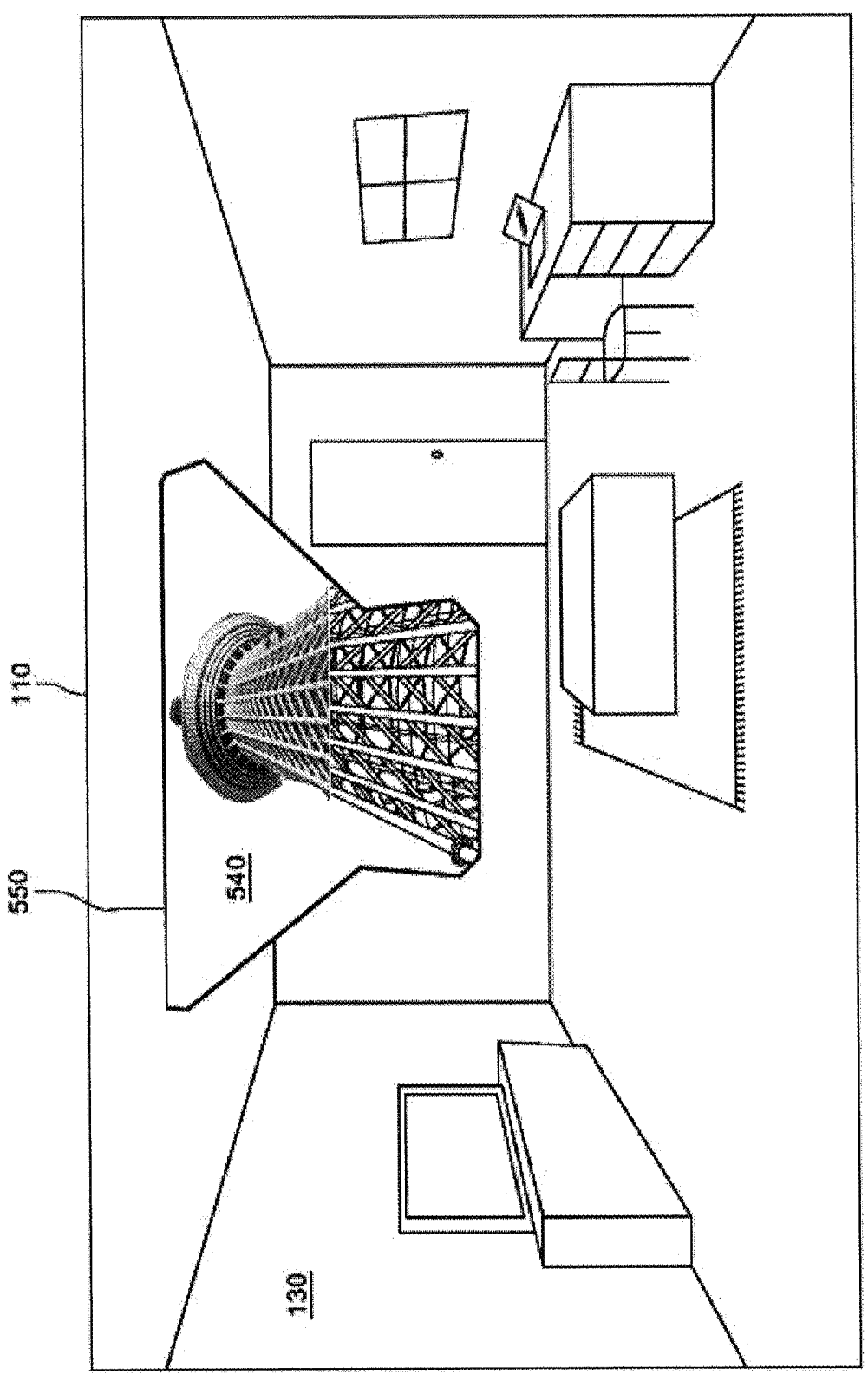
FIG. 5 illustrates a view of an XR environment that includes virtual content displaced behind and viewed through another example viewing portal in accordance with some implementations.

FIG. 5 illustrates virtual content displaced behind and viewed through another example viewing portal. For example, the arrangement of the virtual content in a virtual environment behind (e.g., entered through) the corresponding viewing portal can be based on characteristics of the virtual content. In some implementations, the characteristics of the virtual content include orientation or movement of a capturing electronic device when the virtual content was created. In some implementations, a gravity vector and other sensor data for a capturing electronic device can be used to determine the arrangement (e.g., horizon line, ground plane, pose of a subject therein, etc.) of the virtual content behind the corresponding viewing portal. In some implementations, image analysis of the virtual content can be used to determine the arrangement (e.g., horizon line, ground plane, pose of a subject therein, etc.) of the virtual content behind the corresponding viewing portal in the physical environment.

As shown in FIG. 5, the user 120 views virtual content 540 positioned behind a viewing portal 550 in a depiction of the physical environment 105 using the same orientation as the virtual content 540 creator. In some implementations, a horizon line of the virtual content 540 matches a horizon line of the physical environment 105. In FIG. 5, a skyscraper in the virtual content 540 is displayed on a flat 2D surface oriented toward the viewing portal 550 and may be curved to be 10 meters be behind and above the viewing portal 550. For example, the virtual content 540 could be displayed on the surface 260, which is rotated 90 degrees to have a vertical orientation with respect to the portal 550 in the physical environment 105. However, the positioning is not intended to be so limited and other implementations can provide arrangements of the virtual content 540 behind the viewing portal 550 in the physical environment 105 that maintain or recreate the capturing orientation. For example, the virtual content 540 could be displayed on intersecting orthogonal flat surfaces displaced behind the viewing portal 550 that are a first vertical surface parallel to the far wall and a second horizontal surface parallel to the ceiling of the physical environment 105.

Figure 6A:
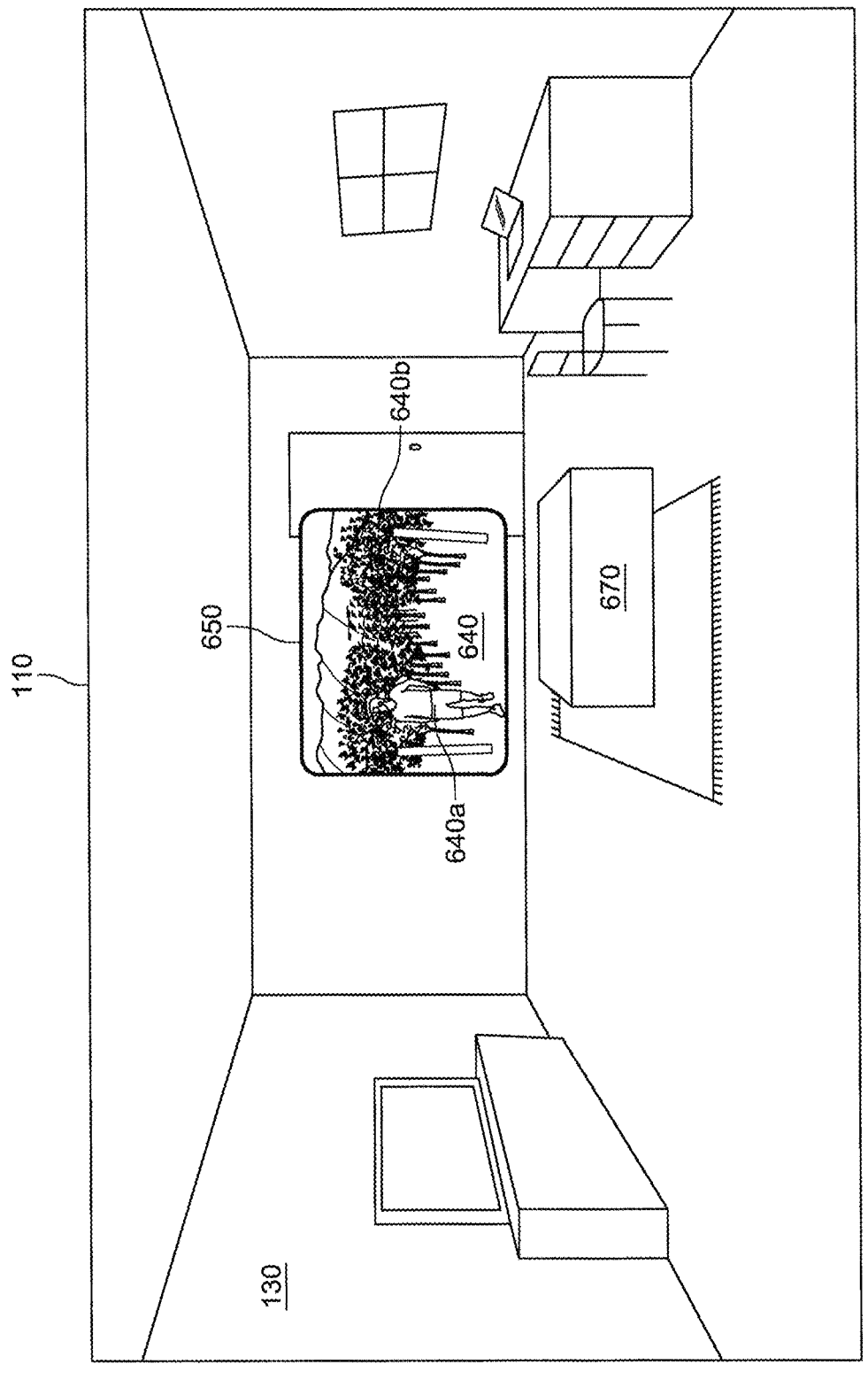
FIG. 6A illustrates a view of an XR environment that includes virtual content displaced behind and viewed through yet another example viewing portal in accordance with some implementations.

FIG. 6A illustrates virtual content placed behind and viewed through yet another example viewing portal. As shown in FIG. 6A, the user 120 views virtual content 640 positioned behind a viewing portal 650 in the physical environment 105. In FIG. 6A, the virtual content 640 is a 2D depth segregated photograph that includes a segregated subject 640a having a first depth and a segregated background 640b having a second depth larger than the first depth.

Figure 6B:
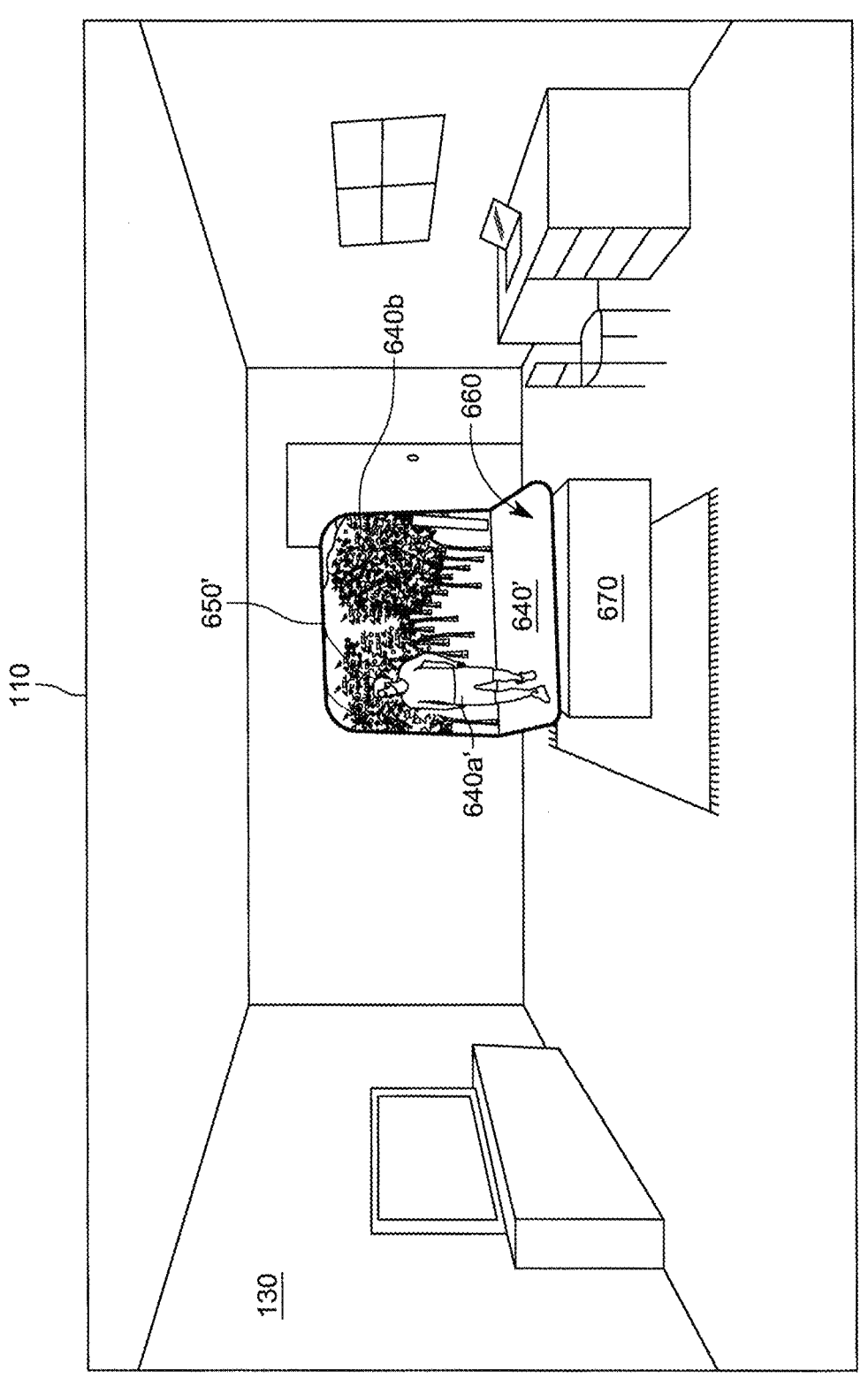
FIG. 6B illustrates a subsequent view of a depth segregated subject of the virtual content of FIG. 6A and a depth segregated background of the virtual content of FIG. 6A that remains viewed through the viewing portal of FIG. 6A in accordance with some implementations.

FIG. 6B illustrates a subsequent view of the depth segregated subject 640a of the virtual content 640 moved in front of and aligned with the depth segregated background 640b that remains viewed by the user 120 through a modified viewing portal 650' in the physical environment 105. As shown in FIG. 6B, a ground plane 660 of the background 640b of the virtual content 640' is extended so that the subject 640a is displayed separated and in front of the background 640b on the ground plane 660. In some implementations, the modified viewing portal 650' has a size based on the size of the subject 640a of the virtual content 640'. In some implementations, the virtual content 640' is a 3D virtual object in the physical environment 105. In some implementations, the virtual content 640' is aligned (e.g., to a flat surface such as the ground plane, a floor, desktop, or tabletop) in the physical environment 105. As shown in FIG. 6B, the virtual content 640' is aligned to a top surface of a box 670. In some implementations, the subject 640a of the virtual content 640' is aligned to a different characteristic (horizon, distinctive feature, etc.) of the background 640b of the virtual content 640'

In some implementations, the virtual content 640 and the viewing portal 650 move as animated objects between the arrangement shown in FIG. 6A and the subsequent configuration shown in FIG. 6B. In some implementations, text can be added having a spatial relationship to the view of the virtual content 640' shown in FIG. 6B. In some implementations, visual effects (e.g., smoke, lightning, celebration effects, etc.) can be added having a spatial relationship to the arrangement of the virtual content 640' shown in FIG. 6B. In some implementations, audio effects (e.g., point source, background sounds, spatial audio, etc.) can be added having a spatial relationship to the view of the virtual content 640' shown in FIG. 6B.

FIG. 7 is a flowchart illustrating an exemplary method that provides a view of an XR environment that depicts a physical or virtual environment with a viewing portal for viewing an added content item that is positioned behind the viewing portal. For example, a panoramic photograph may be textured onto a virtual curved surface that is 10 meters behind the viewing portal. In some implementations, placing a content item behind the viewing portal may provide a desirable appearance, for example, better distinguishing the content item from the physical environment at the edges of the viewing portal and/or giving the viewer the sense that they are looking at an image with depth. In some implementations, the method 700 is performed by a device (e.g., electronic device 800 of FIG. 8). The method 700 can be performed using an electronic device or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the method 700 is performed by an electronic device having a processor.

At block 710, the method 700 determines a first position for a viewing portal within a 3D coordinate system corresponding to an environment (e.g., a physical or virtual environment). In some implementations, an initial position of the viewing portal is a preset location based on the physical environment (e.g., centered) or 3D coordinate system. In some implementations, an initial position of the viewing portal is based on depth data obtained for the physical environment and/or other sensor data. In some implementations, an initial size and/or aspect ratio for the viewing portal may also be determined.

At block 720, the method 700 determines a second position for a content item within the 3D coordinate system, where the second position is opposite a front surface of the viewing portal. In some implementations, the second position is selected at a focal distance behind the first position so a view of the added content item from both eyes of a person would be substantially the same (e.g., little or no parallax). For example, the added content item may be positioned 10 meters behind and centered on the viewing portal. In some implementations, the content item includes depth segmented images, 2D photographs, or 2D panoramic photographs. In some implementations, determining the second position may also involve identifying a surface, e.g., a flat surface or a curved flat surface, upon which to texture the content item. A displayed size of the image corresponding to the content item on the surface object may be based on an original size of the content item or depictions therein.

In some implementations at block 720, the second position is independent of the first position and so the viewing portal may be expanded, stretched, or animated without modifying the content item. In some implementations, the second position is selected to provide the appearance of depth to the content item.

In some implementations at block 720, the second position aligns the content item with respect to the environment or the 3D coordinate system. An alignment of the content item at the second position may be determined using sensor data (e.g., orientation, movement, gravity vector, etc.) from an electronic device that created the content item. In some implementations, the second position aligns a feature (e.g., horizon line) of the image corresponding to the content item on the surface object with a feature (e.g., horizon line) of the environment.

At block 730, the method 700 generates a surface object, where the surface object is textured with an image corresponding to the content item, and where the surface object is positioned at the second position. In some implementations, the content item is a panoramic photograph, and the surface object comprises a virtual curved surface that is a distance behind the viewing portal. In some implementations, the image corresponding to the content item comprises a 2D image corresponding to the content item. In some implementations, the surface object comprises a portion of a cylindrical shell, and an interior surface of the cylindrical shell is textured with the image corresponding to the content item.

At block 740, the method 700 determines a viewpoint of an electronic device within the 3D coordinate system. In some implementations, the viewpoint of the electronic device is determined based on sensor data of the electronic device. In some implementations, the viewpoint of the electronic device is determined relative to the physical environment. In some implementations, an initial position of the viewing portal is a set distance directly in front of the viewpoint.

At block 750, the method 700 identifies a portion of the surface object visible through the viewing portal from the viewpoint, where the portion is identified based on the first position, the second position, and the viewpoint. In some implementations, a size, an aspect ratio, or the first position for the viewing portal is determined based on parameters of an application that is executing when the surface object is viewed and/or characteristics of the content item to be viewed.

At block 760, the method 700 provides a view of the identified portion of the surface object in the environment. In some implementations, the identified portion of the surface content changes as the viewpoint of the electronic device moves in the physical environment. For example, the identified portion may be a subject of the content item.

In some implementations, the viewing portal may distinguish the content item from the physical environment (e.g., using edges of the viewing portal). The viewing portal may distinguish the surface object from the environment using edges of the viewing portal. In some implementations, a size of the viewing portal is smaller than the physical environment and the identified portion of the surface object does not intersect an enclosing surface such as a wall of the physical environment.

In some implementations, positioning different content items behind corresponding multiple viewing portals that may be viewed concurrently in the physical or virtual environment is determined so that respective focal distances of viewable portions of the different content items are similar to each other and all different than a distance to the multiple viewing portals within the physical or virtual environment. In some implementations, multiple viewing portals of different content items may be viewed concurrently and selection of one of the content items may provide an expanded viewing portal so that more of the selected content item becomes visible in the physical environment. Alternatively, multiple viewing portals of the same content item may be used to allow comparison of different imaging effects applied to the same content item.

The method 700 may involve providing a view of a plurality of viewing portals corresponding to a plurality of different content items in the environment, where the plurality of viewing portals comprises the viewing portal and the plurality of content items comprises the content item. The plurality of content items may be provided on a plurality of surface objects at a consistent focal distance behind corresponding viewing portals of the plurality of viewing portals. In accordance with a selection of one of the plurality of content items, a size of a corresponding one of the plurality of viewing portals may be expanded.

In some implementations, the content item includes a first portion with a first depth and a second portion with a second larger depth. Then, a size of the viewing portal is reduced while part of the surface object corresponding to the second portion remains visible, and concurrently the first portion is moved to a position in on a ground plane in front of the size reduced viewing portal while changing the first portion to a corresponding size.

In some implementations, blocks 710-760 are repeatedly performed. In some implementations, the techniques disclosed herein may be implemented on a wearable device, such as an HMD having an optical see-through or opaque display.

While the examples provided above describe the use of viewing portals in a physical environment, it should be appreciated that the viewing portals may also be used to view content in a virtual environment to provide similar benefits.

Figure 8:
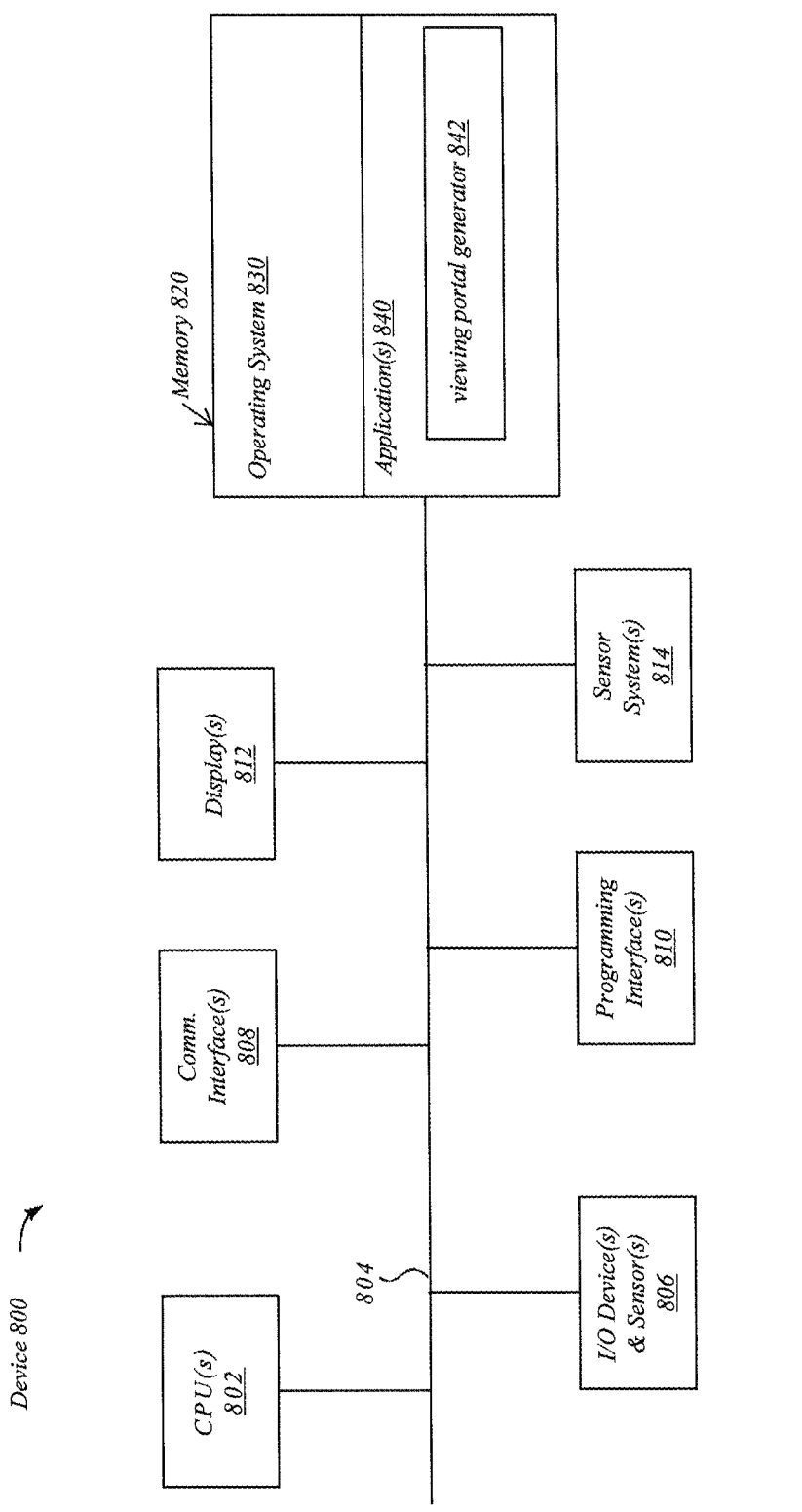
FIG. 8 illustrates an exemplary electronic device in accordance with some implementations.

FIG. 8 is a block diagram of an example device 800. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 800 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 810, one or more displays 812, one or more interior or exterior facing sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 812 are configured to present content to the user. In some implementations, the one or more displays 812 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), or the like display types. In some implementations, the one or more displays 812 correspond to diffractive, reflective, polarized, holographic, etc. waveguide displays. For example, the electronic device 800 may include a single display. In another example, the electronic device 800 includes a display for each eye of the user.

In some implementations, the one or more sensor systems 814 include an image capture device or array that captures image data or an audio capture device or array (e.g., microphone) that captures audio data. The one or more image sensor systems 814 may include one or more RGB cameras (e.g., with a complimentary metal-oxide-semiconductor (CMOS) image sensor or a charge-coupled device (CCD) image sensor), monochrome cameras, IR cameras, or the like. The one or more sensor systems 814 may include inward or outward facing sensors. In some implementations, the one or more image sensor systems 814 further include an illumination source that emits light such as a flash. In some implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

In some implementations, the instruction set(s) 840 include a viewing portal generator 842 that is executable by the processing unit(s) 802 to provide a viewing portal in a physical environment for viewing added virtual content that is positioned behind the viewing portal according to one or more of the techniques disclosed herein.

Although the instruction set(s) 840 are shown as residing on a single device, it should be understood that in other implementations, any combination of the elements may be located in separate computing devices. FIG. 8 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
   at one or more processors of an electronic device:

determining a first position for a viewing portal within a three dimensional (3D) coordinate system corresponding to an environment;
   determining a second position for a content item within the 3D coordinate system, wherein the second position is positioned at a distance behind a front surface of the viewing portal;
   generating a surface object, wherein the surface object is textured with an image corresponding to the content item, and wherein the surface object is positioned at the second position;
   determining a viewpoint of the electronic device within the 3D coordinate system;
   identifying a portion of the surface object visible through the viewing portal from the viewpoint, wherein the portion is identified based on the first position, the second position, and the viewpoint; and
   providing a view of the identified portion of the surface object in the environment.

2. The method of claim 1, wherein the content item comprises a depth segmented image, a two-dimensional (2D) photo, or a panoramic photo.

3. The method of claim 1, wherein the second position is independent of the first position and selected to provide an appearance of depth to the content item.

4. The method of claim 1 further comprising expanding, stretching, or animating the viewing portal without modifying the content item.

5. The method of claim 1, wherein the identified portion of the surface object changes as the viewpoint of the electronic device moves in the environment.

6. The method of claim 1, wherein a size of the viewing portal is smaller than the environment and the identified portion of the surface object does not intersect an enclosing surface of the environment.

7. The method of claim 1, wherein the second position is determined using sensor data from a second electronic device that created the content item.

8. The method of claim 1, wherein a size or aspect ratio of the viewing portal is determined based on parameters of an application that is executing when the surface object is viewed or characteristics of the content item.

9. The method of claim 1, wherein the second position is determined based on the content item.

10. The method of claim 1, further comprising aligning a horizon line of the image corresponding to the content item on the surface object with a horizon line of the environment.

11. The method of claim 1, wherein a displayed size of the image corresponding to the content item on the surface object is based on an original size of depictions in the content item.

12. The method of claim 1, further comprising:
   providing a view of a plurality of viewing portals corresponding to a plurality of different content items in the environment, wherein the plurality of viewing portals comprises the viewing portal and the plurality of content items comprises the content item, and wherein the plurality of content items are provided on a plurality of surface objects at a consistent focal distance behind corresponding viewing portals of the plurality of viewing portals; and
   in accordance with a selection of one of the plurality of content items, expanding a size of a corresponding one of the plurality of viewing portals.

13. The method of claim 1, further comprising:
   providing a view of a plurality of viewing portals that comprise views of different portions of the surface object based on the second position, the viewpoint, and respective locations of the plurality of viewing portals, wherein each of the plurality of viewing portals shows a different imaging effect applied to the surface object.

14. The method of claim 1, wherein the content item comprises a first portion with a first depth and a second portion with a second larger depth, the method further comprising:

reducing a size of the viewing portal while part of the surface object corresponding to the second portion remains visible therethrough; and concurrently moving the first portion to a position on a ground plane in front of the size reduced viewing portal while changing the first portion to a corresponding size.

15. The method of claim 1, further comprising:

identifying a portion of the content item corresponding to a subject of the content item; and selecting an aspect ratio of the viewing portal to match the identified portion of the content item corresponding to the subject of the content item.

16. The method of claim 1, wherein the viewing portal distinguishes the surface object from the environment using edges of the viewing portal.

17. The method of claim 1, wherein the content item is a panoramic photograph, and wherein the surface object comprises a virtual curved surface that is positioned at the distance behind the front surface of the viewing portal.

18. The method of claim 1, wherein the environment is a physical environment or a 3D virtual environment.

19. The method of claim 1, wherein the electronic device is a head mounted device.

20. The method of claim 1, wherein the image corresponding to the content item comprises a 2D image corresponding to the content item.

21. The method of claim 1, wherein the surface object comprises a portion of a cylindrical shell, and wherein an interior surface of the cylindrical shell is textured with the image corresponding to the content item.

22. The method of claim 21, wherein the cylindrical shell is centered around the first position.

23. A system comprising:

memory; and one or more processors at a device coupled to the memory, wherein the memory comprises program instructions that, when executed on the one or more processors, cause the system to perform operations comprising:

determining a first position for a viewing portal within a three dimensional (3D) coordinate system corresponding to an environment;

determining a second position for a content item within the 3D coordinate system, wherein the second position is positioned at a distance behind a front surface of the viewing portal;

generating a surface object, wherein the surface object is textured with an image corresponding to the content item, and wherein the surface object is positioned at the second position;

determining a viewpoint of an electronic device within the 3D coordinate system;

identifying a portion of the surface object visible through the viewing portal from the viewpoint, wherein the portion is identified based on the first position, the second position, and the viewpoint; and providing a view of the identified portion of the surface object in the environment.

24. The system of claim 23, wherein the content item comprises a depth segmented image, a two-dimensional (2D) photo, or a panoramic photo.

25. A non-transitory computer-readable storage medium, storing program instructions executable via one or more processors to perform operations comprising:

determining a first position for a viewing portal within a three dimensional (3D) coordinate system corresponding to an environment;

determining a second position for a content item within the 3D coordinate system, wherein the second position is positioned at a distance behind a front surface of the viewing portal;

generating a surface object, wherein the surface object is textured with an image corresponding to the content item, and wherein the surface object is positioned at the second position;

determining a viewpoint of an electronic device within the 3D coordinate system;

identifying a portion of the surface object visible through the viewing portal from the viewpoint, wherein the portion is identified based on the first position, the second position, and the viewpoint; and providing a view of the identified portion of the surface object in the environment.

* * * * *